United States Patent
Yi et al.

(10) Patent No.: US 11,221,261 B2
(45) Date of Patent: Jan. 11, 2022

(54) DEVICE FOR MEASURING HEAT TRANSFER RATE

(71) Applicant: KOREA ATOMIC ENERGY RESEARCH INSTITUTE, Daejeon (KR)

(72) Inventors: Sungjae Yi, Daejeon (KR); Hyunsik Park, Daejeon (KR); Sunguk Ryu, Daejeon (KR); Jinhwa Yang, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 253 days.

(21) Appl. No.: 16/493,066

(22) PCT Filed: Oct. 24, 2017

(86) PCT No.: PCT/KR2017/011757
§ 371 (c)(1),
(2) Date: Sep. 11, 2019

(87) PCT Pub. No.: WO2018/186544
PCT Pub. Date: Oct. 11, 2018

(65) Prior Publication Data
US 2020/0072683 A1 Mar. 5, 2020

(30) Foreign Application Priority Data

Apr. 3, 2017 (KR) .................. 10-2017-0043221

(51) Int. Cl.
*G01K 17/00* (2006.01)
*G01K 17/04* (2006.01)

(52) U.S. Cl.
CPC .................. *G01K 17/04* (2013.01)

(58) Field of Classification Search
CPC combination set(s) only.
See application file for complete search history.

(56) References Cited

U.S. PATENT DOCUMENTS

| 4,696,578 A | 9/1987 | Mansuria et al. |
| 6,202,480 B1 * | 3/2001 | Mauze .................. G01N 25/64 |
| | | 374/109 |

(Continued)

FOREIGN PATENT DOCUMENTS

| JP | 2003-57121 A | 2/2003 |
| JP | 2003-130737 A | 5/2003 |

(Continued)

OTHER PUBLICATIONS

KR20090079423 EPO translation (Year: 2009).*
International Search Report dated Mar. 6, 2018 issued in PCT/KR2017/011757.

*Primary Examiner* — Lisa M Caputo
*Assistant Examiner* — Nasir U. Ahmed
(74) *Attorney, Agent, or Firm* — Scully Scott Murphy and Presser

(57) ABSTRACT

A device for measuring a heat transfer rate according to the present invention includes: a first layer provided with a first material portion and a second material portion disposed in parallel in a surface direction of an object; a second layer provided with a third material portion disposed in parallel with the first material portion in a thickness direction of the first layer and having the same thermal conductivity as the second material portion, and a fourth material portion disposed in parallel with the second material portion in the thickness direction and having the same thermal conductivity as the first material portion; and a temperature measurement layer to measure a temperature difference in the surface direction between the first layer and the second layer, wherein the temperature measurement layer includes: a (Continued)

thermocouple portion provided with a first contact between the first material portion and the third material portion, and a second contact between the second material portion and the fourth material portion; and a noise detector having a shape corresponding to the thermocouple portion. Accordingly, an amount of electric noise can be detected and removed, thereby improving accuracy.

8 Claims, 5 Drawing Sheets

(56) References Cited

U.S. PATENT DOCUMENTS

| | | | | |
|---|---|---|---|---|
| 2008/0080591 A1* | 4/2008 | Tanaka | ............... | G01K 17/006 |
| | | | | 374/179 |
| 2012/0109571 A1* | 5/2012 | Shimizu | ............... | G01K 1/165 |
| | | | | 702/130 |

FOREIGN PATENT DOCUMENTS

| | | |
|---|---|---|
| JP | 2007-271456 A | 10/2007 |
| JP | 2008-89475 A | 4/2008 |
| JP | 2010-025926 A | 2/2010 |
| KR | 2009-0079423 A | 7/2009 |
| KR | 10-0912669 B1 | 8/2009 |
| KR | 10-20110064349 A | 6/2011 |

\* cited by examiner (a)

(b)

(c)

DEVICE FOR MEASURING HEAT TRANSFER RATE

TECHNICAL FIELD

The present invention relates to a device for measuring a heat transfer rate capable of measuring a heat transfer rate of an object by being attached on a surface of the object.

BACKGROUND ART

A heat transfer phenomenon takes place in a form of at least one of conduction, convection, and radiation. A heat transfer rate, which is an amount of heat transferred per unit time, is a physical quantity which is needed to be researched and measured in studies related to a heat transfer and a wide range of industrial field. The heat transfer rate is also expressed as a heat flux which generally has a heat quantity per unit time (for example, [kJ/s=kW]) or a heat quantity per unit area and time (for example, [kW/m2]).

As a device for measuring a heat transfer rate or heat flux, a heat transfer rate measuring sensor or a heat flux sensor has been continuously improved in order to enhance measurement accuracy and reliability. Particularly, in recent years, miniaturization using a microelectromechanical system (MEMS) technology has been realized, and accordingly, application fields are widely spreading.

A typical layered-type heat transfer rate measuring sensor is configured to calculate a heat transfer rate by measuring temperatures at two points, between which a temperature difference is generated by a heat transfer, using thermocouple or thermopile. At this time, in the related art sensors, the two points for measuring the temperature difference mostly form one surface attached to an object and another surface exposed to external air. This configuration has various error factors according to a measurement environment such as attachment to the object or exposure to outside.

Thus, as proposed in Patent Document 1, a technique in which two contacts are formed in a sensor in a surface direction and a heat transfer rate in a thickness direction can be calculated using a temperature difference in the surface direction.

However, in the related art structure as disclosed in Patent Document 1, an error factor which is likely to be caused due to the exposure of the contacts has been removed, but probability that noise is to be involved in an electromotive force, which is an electric signal sensed in thermocouple, still remains. An error may also be likely to be generated in a measurement result when a change occurs in an air flow of a surrounding environment in which the object is located.

In designing a heat transfer rate measurement device in which the same principle as disclosed in Patent Document 1 is realized, there is room for variously modifying a layered structure to enhance convenience in fabrication, and accurately calculating a heat transfer rate by reflecting such modified structures.

(Patent Document 1) Patent Registration No. KR10-0912669 B1 (Aug. 11, 2009)

DISCLOSURE

Technical Problem

A first aspect of the present invention is to provide a device for measuring a heat transfer rate, capable of eliminating an error due to intervention of electric noise in measuring a temperature difference in a surface direction of an object, in order to calculate a heat transfer rate of the surface of the object.

A second aspect of the present invention is to provide a device for measuring a heat transfer rate, capable of detecting an affection of convection due to an air flow around an object, in calculating a heat transfer rate of a surface of the object.

A third aspect of the present invention is to provide a device for measuring a heat transfer rate, capable of calculating a heat transfer rate of an object by detecting a temperature difference in a surface direction of the object, and of being constructed in various sectional structures.

Technical Solution

In order to achieve the first aspect of the present invention, a device for measuring a heat transfer rate may include a first layer provided with a first material portion and a second material portion having different thermal conductivities, a second layer provided with a third material portion disposed in parallel with the first material portion in a thickness direction of the first layer and having the same thermal conductivity as the second material portion, and a fourth material portion disposed in parallel with the second material portion in the thickness direction and having the same thermal conductivity as the first material portion, and a temperature measurement layer configured to measure a temperature difference in the surface direction between the first layer and the second layer. The temperature measurement layer may include a thermocouple portion provided with a first contact located between the first material portion and the third material portion, and a second contact located between the second material portion and the fourth material portion, and a noise detector having a shape corresponding to the thermocouple portion and disposed in parallel with the thermocouple portion.

To achieve the second aspect of the present invention, a device for measuring a heat transfer rate may include a first layer provided with a first material portion and a second material portion having different thermal conductivities, a second layer provided with a third material portion disposed in parallel with the first material portion in a thickness direction of the first layer and having the same thermal conductivity as the second material portion, a fourth material portion disposed in parallel with the second material portion in the thickness direction and having the same thermal conductivity as the first material portion, and a fifth material portion formed to overlap at least part of the first and second material portions in the thickness direction, and a temperature measurement layer configured to measure a temperature difference in the surface direction between the first layer and the second layer. The temperature measurement layer may include a thermocouple portion provided with a first contact located between the first material portion and the third material portion, and a second contact located between the second material portion and the fourth material portion, and a convection sensing thermocouple portion provided with a third contact located between the first material portion and the fifth material portion, and a fourth contact disposed between the second material portion and the fifth material portion.

In order to achieve the third aspect of the present invention, a device for measuring a heat transfer rate may include a first material portion having one surface thereof facing a surface of an object, a second material portion located adjacent to the first material portion in a manner that one surface thereof faces the surface of the object, and made of a material having thermal conductivity different from that of the first material portion, a third material portion coupled to another surface of the first material portion and having the same thermal conductivity and thickness as those of the second material portion, a fourth material portion coupled to another surface of the second material portion to be adjacent to the third material portion and having the same thermal conductivity and thickness as those of the first material portion, and a thermocouple portion provided with a first contact located within the first or third material portion, and a second contact located inside the fourth or second material portion to be spaced apart from the first contact in a surface direction of the object.

Advantageous Effects

According to the present invention having such configuration described above, the following effects can be obtained.

First, a heat transfer rate measurement device according to the present invention can be provided with a noise detector having the same shape as a thermocouple portion measuring a temperature difference in a surface direction, so as to remove electric noise from a signal of the thermocouple portion. Thus, accuracy of measurement of the temperature difference can be improved, and thus accuracy of a calculated heat transfer rate can be enhanced.

Second, a heat transfer rate measurement device according to the present invention may be provided with a convection sensing thermocouple portion which is sensitive to changes in an external air convection flow and thus can detect an affection of the external air. Accordingly, the affection of the external air can be continuously monitored, and a sensible temperature level can be calculated. Therefore, integrated information related to an external environment can be obtained and accuracy of calculation of a heat transfer rate can be improved.

Third, a heat transfer rate measurement device according to the present invention can be configured such that thicknesses of material portions forming a pair in an opposite direction are more freely designed, and the thicknesses can be reflected for the calculation of the heat transfer rate, thereby alleviating restrictions in terms of shape and material. Accordingly, the heat transfer rate measurement device according to the present invention can be easily fabricated in various shapes.

MODE FOR INVENTION

Figure 1:
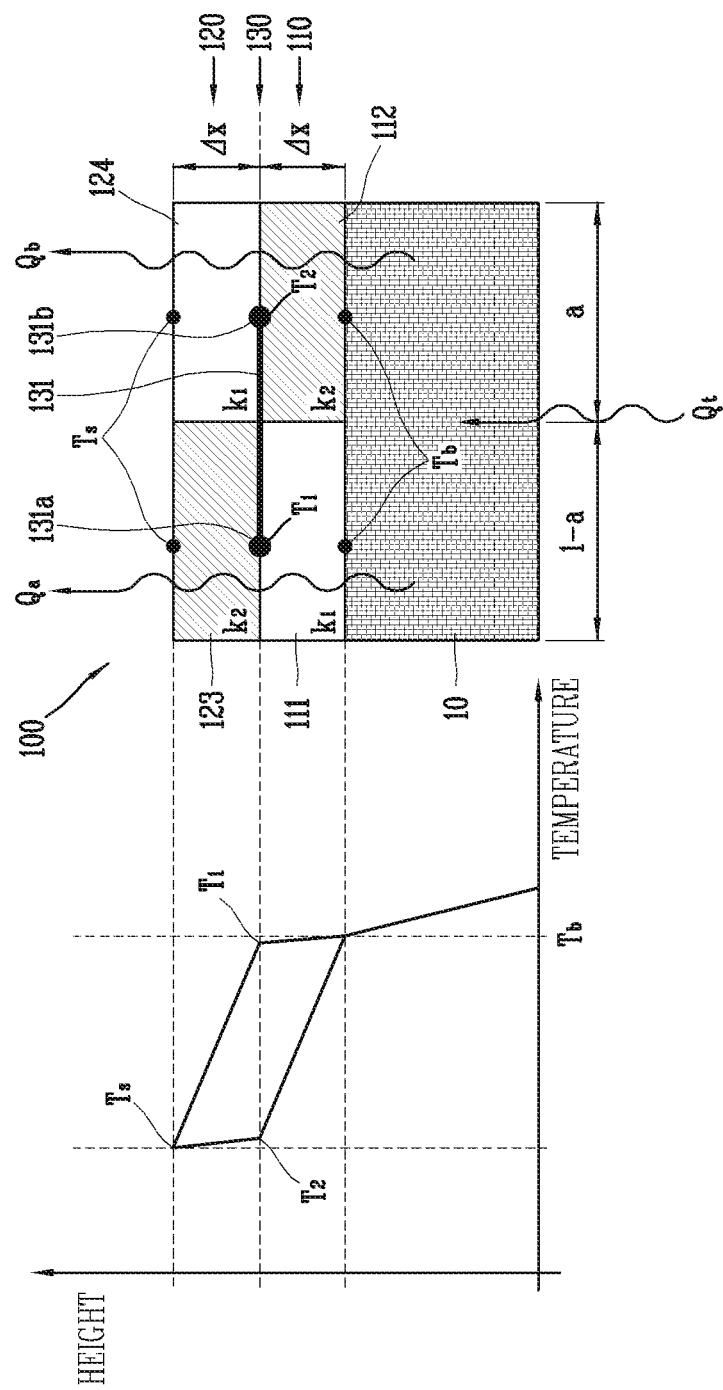
FIG. 1 is a view illustrating a concept in which a heat transfer rate measurement device calculates a heat transfer rate of an object in accordance with the present invention.

Hereinafter, a heat transfer rate measurement device according to the present invention will be described in detail with reference to the drawings.

Even in different embodiments, the same/like reference numerals are provided to the same/like components to those of previous embodiments, and redundant description thereof will be omitted.

In describing the present invention, moreover, the detailed description will be omitted when a specific description for publicly known technologies to which the invent ion pertains is judged to obscure the gist of the present invent ion.

The accompanying drawings are used to help easily understanding various technical features and it should be understood that the embodiments presented herein are not limited by the accompanying drawings. As such, the present disclosure should be construed to extend to any alterations, equivalents and substitutes in addition to those which are particularly set out in the accompanying drawings.

A singular representation may include a plural representation unless it represents a definitely different meaning from the context.

FIG. 1 is a view illustrating a concept that a heat transfer rate of an object 10 is calculated by a heat transfer rate measurement device 100 according to the present invention. Referring to FIG. 1, the heat transfer rate measurement device 100 according to the present invention includes first and second layers 110 and 120 and a temperature measurement layer 130. The heat transfer rate measurement device 100 according to the present invention is attached to a surface of the object 10 to measure a heat transfer rate (or a heat flux) formed on the surface of the object 10.

The first and second layers 110 and 120 function as a structure forming a temperature gradient by a conductive heat transfer. The temperature measurement layer 130 may be supported and protected by the first and second layers 110 and 120. The first layer 110 may be located on the surface of the object 10 and the second layer 120 may be located on a surface of the first layer 110. That is, the first and second layers 110 and 120 may form a layered structure of being laminated (layered) in parallel in a thickness direction (in a vertical direction in FIG. 1) of the heat transfer rate measurement device 100 according to the present invention.

However, in the heat transfer rate measurement device 100 according to the present invention, the first layer 110 is provided with first and second material portions 111 and 112, and the second layer 120 is provided with third and fourth material portions 123 and 124. At this time, the first and second material portions 111 and 112 may be made of materials having different thermal conductivities and maybe arranged in parallel in the surface direction of the object 10 (a left/right direction illustrated in FIG. 1).

The second layer 120 disposed on the first layer 110 includes the fourth material portion 124 having the same thermal conductivity as that of the first material portion 111, and the third material portion 123 having the same thermal conductivity as that of the second material portion 112. The third material portion 123 is arranged in parallel with the first material portion 111 in the thickness direction and the fourth material portion 124 is arranged in parallel with the second material portion 112 in the thickness direction.

As a result, as illustrated in FIG. 1, the first and second layers 110 and 120 may be formed such that the material portions having the same thermal conductivity are arranged in an alternating manner. Also, as illustrated, the first to fourth material portions 111, 112, 123, and 124 may have the same size in the thickness direction and the surface direction.

Meanwhile, the temperature measurement layer 130 serves to detect a temperature difference for measuring a heat transfer rate of the object 10 in the present invention. In particular, the temperature measurement layer 130 of the present invention is configured to measure a temperature difference in the surface direction.

The temperature measurement layer 130 is provided with a thermocouple portion 131 having first and second contacts 131a and 131b. The first contact 131a is located between the first material portion 111 and the third material portion 123 and the second contact 131b is located between the second material portion 112 and the fourth material portion 124. Since the thermocouple portion 131 is interposed between the first layer 110 and the second layer 120, the thermocouple portion 131 may be disposed in parallel with the first and second layers 110 and 120 in the surface direction.

Hereinafter, description will be given of a process of calculating a heat transfer rate in the heat transfer rate measurement device 100 according to the present invention, with reference to FIG. 1.

A surface temperature of the object 10 to which the heat transfer rate measurement device 100 according to the present invention is attached may be expressed as Tb. A temperature on a surface of the second layer 120 of the present invention may be expressed as Ts. Tb and Ts may have predetermined values, respectively, due to a smooth heat exchange in the surface direction.

Each thickness of the first and second layers 110 and 120 may have a predetermined value expressed as $\Delta X$, as illustrated, and a cross-sectional area where a heat transfer occurs may be expressed as A. A ratio of lengths of the material portions in the surface direction may be expressed as 1−a and a, but it is assumed that the respective material portions have the same length (a=0.5) as described above. As illustrated in FIG. 1, it is assumed that the thermal conductivity of the first and fourth material portions 111 and 124 is k1, the thermal conductivity of the second and third material portions 112 and 123 is k2, and k1>k2.

An equation for a conductive heat transfer in the vertical direction (the thickness direction) of the heat transfer rate measurement device 100 according to the present invention illustrated in FIG. 1 is expressed as follows.

$$Q_t = \frac{1}{R_t}(T_b - T_s)$$

At this time, a total thermal resistance Rt is defined as follows.

$$R \equiv \frac{\Delta x}{kA}$$

The total heat resistance Rt corresponds to a case where unit thermal resistances are connected in series and in parallel in the thickness direction, and may be calculated as follows (R1 and R2 are thermal resistances of the first and second material portions 111 and 112 Ra and Rb are thermal resistances of Qa and Qb, respectively, which will be described later).

$$R_1 = \frac{\Delta x}{k_1(0.5A)}$$

$$R_a = R_b = R_1 + R_2 = \frac{\Delta x}{(0.5A)}\left(\frac{k_1 + k_2}{k_1 k_2}\right)$$

$$\frac{1}{R_t} = \frac{1}{R_a} + \frac{1}{R_b} = \frac{A}{\Delta x}\left(\frac{k_1 k_2}{k_1 + k_2}\right)$$

A total heat transfer rate Qt is expressed by the sum of a heat transfer rate Qa flowing along the first and third material portions 111 and 123 and a heat quantity Qb flowing along the second and fourth material portions 112 and 124.

$$Q_t = Q_a + Q_b$$

The above equation may be expressed as the conductive heat transfer equation including the term of the heat resistance, thereby obtaining the following equation.

$$T_b - T_s = \left(\frac{k_1 + k_2}{k_1 - k_2}\right)(T_1 - T_2)$$

That is, a temperature difference (T1−T2) measured at the first and second contacts 131a and 131b in the surface direction of the heat transfer rate measurement device 100 according to the present invention has a relationship in direct proportion to a temperature difference (Tb−Ts) in the thickness direction.

Furthermore, by substituting the above equation into the total conductive heat transfer equation, the following equation may be derived.

$$Q_t = \frac{A}{\Delta x}\left(\frac{k_1 k_2}{k_1 - k_2}\right)(T_1 - T_2)$$

The heat transfer rate Qt in the thickness direction of the object 10 may be calculated by reflecting the temperature difference sensed from the thermocouple portion 131 of the temperature measurement layer 130.

As described above, since the heat transfer rate of the object 10 is calculated based on the temperature difference in the surface direction according to the relation equation, as described above, the heat transfer rate measurement device 100 according to the present invention is not required to arrange the contacts of the thermocouple in a spacing manner in the thickness direction. Therefore, the device in a form of a thin film can be minimized in thickness, so as to be effectively reduced in size.

In addition, since the temperature measurement layer 130 is interposed between the first layer 110 and the second layer 120, a thermal contact state or insulation state of the thermocouple portion 131 can be easily ensured, thereby improving accuracy of a measurement result.

Figure 2:
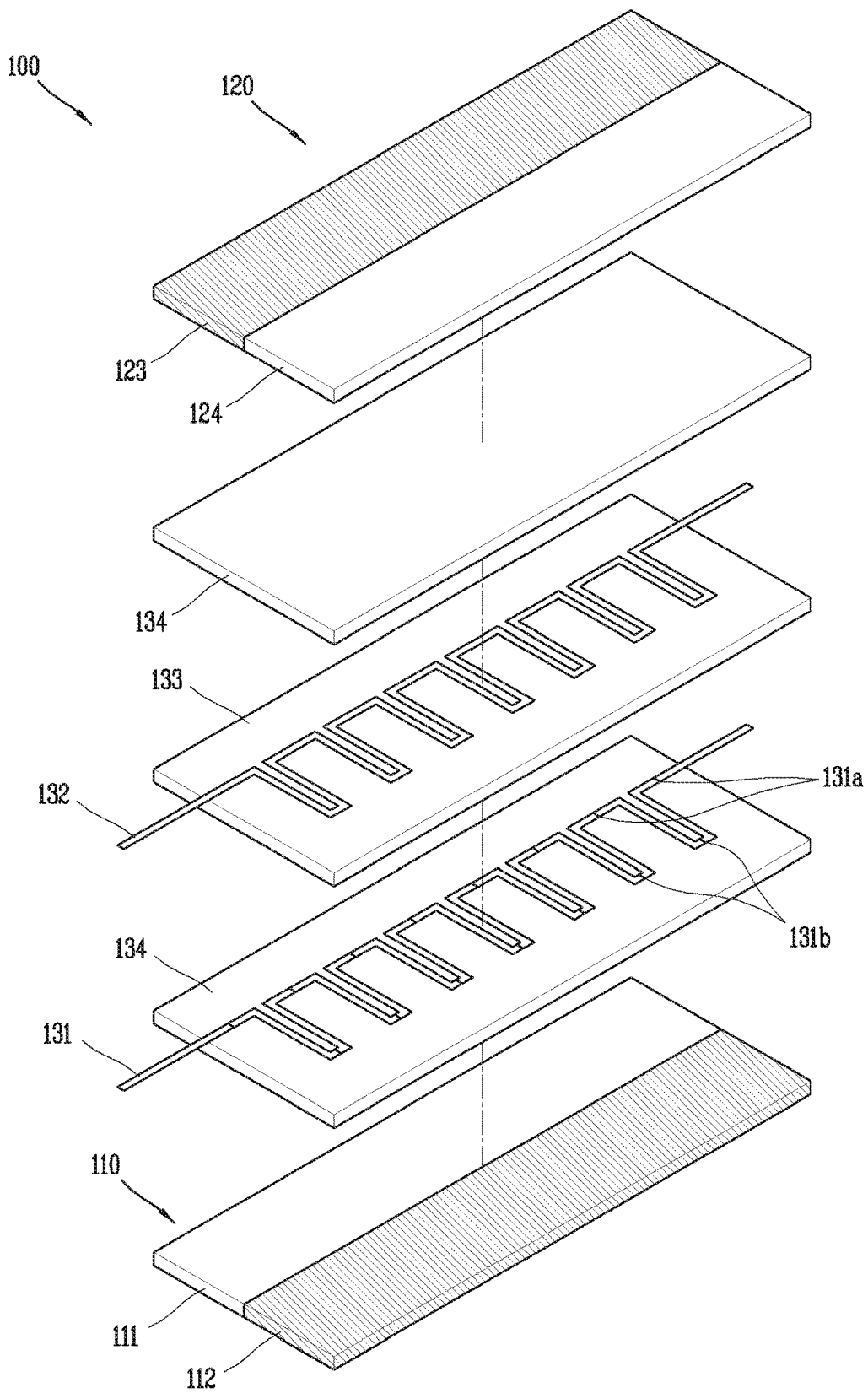
FIG. 2 is an exploded perspective view illustrating a heat transfer rate measurement device in accordance with one embodiment of the present invention.
Figure 3:
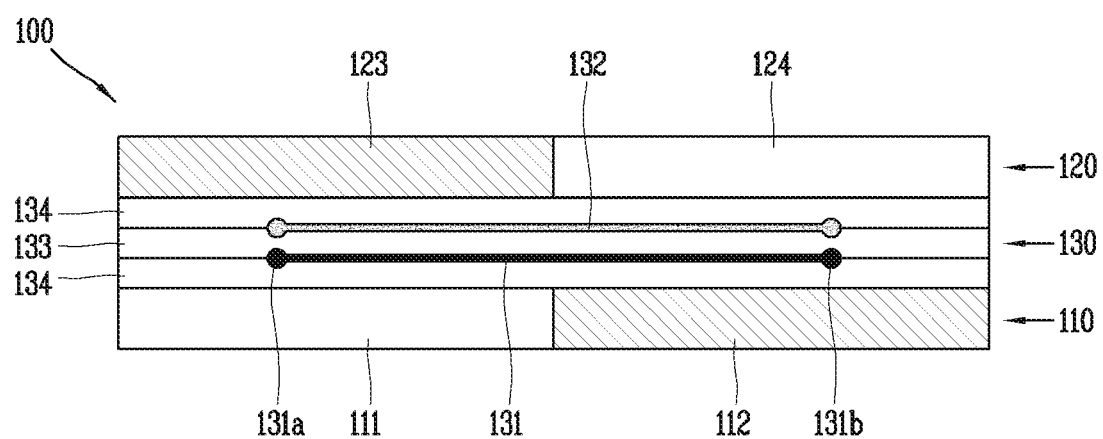
FIG. 3 is a sectional view of the heat transfer rate measurement device illustrated in FIG. 2.

FIG. 2 is an exploded perspective view illustrating a heat transfer rate measurement device 100 according to one embodiment of the present invention, and FIG. 3 is a sectional view of the heat transfer rate measurement device 100 illustrated in FIG. 2. Hereinafter, description will be given of a configuration capable of calculating a result by removing noise of an electric signal generated in the heat transfer rate measurement device 100 according to the present invention, with reference to FIGS. 2 and 3.

As illustrated in FIGS. 2 and 3, the temperature measurement layer 130 according to the present invention may further include a noise detector 132. The noise detector 132 functions to detect electrical noise (noise).

In detail, the noise detector 132 may have a shape corresponding to the thermocouple portion 131 and may be disposed in parallel with the thermocouple portion 131 with being spaced apart from each other in the thickness direction. As illustrated in FIGS. 2 and 3, when the thermocouple portion 131 is configured as a thermopile formed in a manner of overlapping a plurality of thermocouples, the noise detector 132 may extend in a zigzag manner to correspond to the shape. That is, the noise detector 132 may be formed to overlap the thermocouple portion 131 accurately in the thickness direction. The noise detector 132 may be made of a conductive material, and both end portions thereof maybe electrically connected to a controller (not illustrated) for measuring an electromotive force.

At this time, the noise detector 132 may be spaced apart from the thermocouple portion 131 to prevent current from flowing therealong. For example, an insulating portion 133 extending in the surface direction may be interposed between the noise detector 132 and the thermocouple portion 131. As illustrated in FIGS. 2 and 3, considering the materials of the first to fourth material portions 111, 112, 123, and 124, insulating layers 134 for maintaining insulation may be provided on upper and lower sides of the temperature measurement layer 130, respectively. Therefore, the insulating portion 133 interposed between the noise detector 132 and the thermocouple portion 131 may also be laminated by being made in the same shape and of the same material as those of the insulating layers 134.

Figure 4:
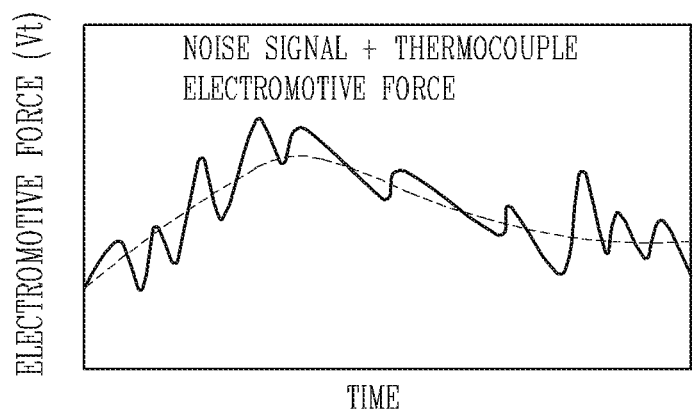
FIG. 4 is a conceptual view illustrating a method of removing signal noise using an electromotive force sensed by a noise detector illustrated in FIG. 2.
Figure 4:
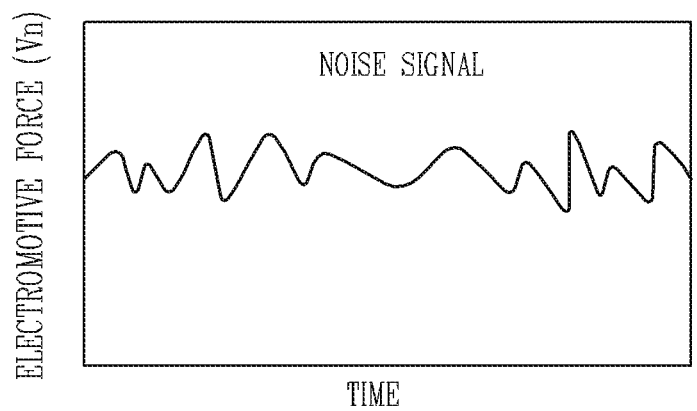
Figure 4:
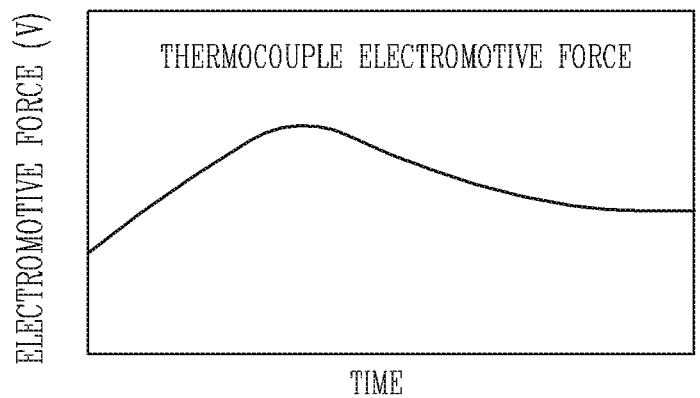

FIG. 4 is a conceptual view illustrating a method of removing signal noise using an electromotive force detected by the noise detector 132 illustrated in FIGS. 2 and 3. As illustrated in (a) of FIG. 4, when the heat transfer rate measurement device 100 according to the present invention is attached to the object 10, an electromotive force Vt sensed by the thermocouple portion 131 may contain electric noise. That is, the electromotive force Vt measured by the thermocouple portion 131 may be in a state where electric noise is intervened in the electromotive force generated due to a temperature difference between the first and second contacts 131a and 131b. An inaccurate heat transfer rate may be calculated if the electromotive force Vt of the thermocouple portion 131 is converted to the temperature difference as it is.

When the noise detector 132 is further provided according to this embodiment, while the thermocouple portion 131 measures the electromotive force Vt as illustrated in (a) of FIG. 4, the noise detector 132 may detect a noise electromotive force Vn of a profile as illustrated in (b) of FIG. 4. Since the noise detector 132 extends using a single electric conductive material, only a pure electric noise signal that is independent of the temperature difference between the first and second contacts 131a and 131b may be formed in the noise detector 132.

The heat transfer rate measurement device 100 according to the present invention may further include a controller that plays a role of processing an electromotive force signal (Vt) of the thermocouple portion 131 by using the noise electromotive force signal (Vn) obtained in the noise detector 132. The controller may generate an electromotive force signal, as illustrated in (c) of FIG. 4, obtained by subtracting the noise electromotive force Vn detected by the noise detector 132 from the electromotive force Vt detected by the thermocouple portion 131. Then, the controller maybe configured to calculate a temperature difference (T1–T2) between the first contact 131a and the second contact 131b corresponding to the signal profile as illustrated in (c) of FIG. 4. Also, the controller may be configured to calculate the heat transfer rate of the object 10 from the temperature difference (T1–T2) in the surface direction.

By further providing the noise detector 132 in the heat transfer rate measurement device 100 according to the present invention, the electrical noise intervened into the electromotive force signal of the thermocouple portion 131 can be detected and removed. This may result in improving accuracy with respect to the temperature difference value in the surface direction, and accordingly, increasing accuracy and reliability of the heat transfer rate. In particular, since an electromotive force generated due to a temperature difference that maybe finely caused can be accurately sorted, when the heat transfer rate measurement device 100 is fabricated in the form of the thin film by the MEMS technology, accuracy of measurement can be improved.

Figure 5:
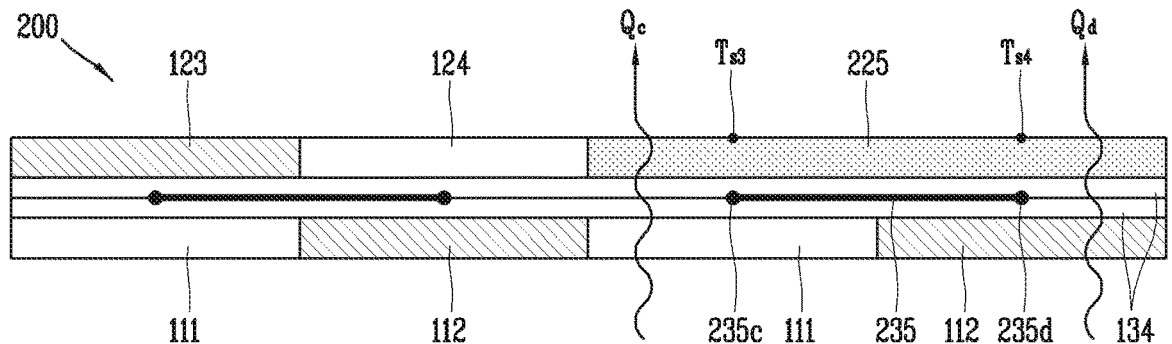
FIG. 5 is a sectional view illustrating a heat transfer rate measurement device in accordance with another embodiment of the present invention.

Meanwhile, FIG. 5 is a sectional view illustrating a heat transfer rate measurement device 200 according to another embodiment of the present invention. Hereinafter, description will be given of a configuration for detecting an affection of non-uniform convection due to an external fluid (air, etc.) according to another embodiment of the present invention.

As illustrated in FIG. 5, the heat transfer rate measurement device 200 according to this embodiment includes first and second layers 110 and 120 and a temperature measurement layer 130, similar to the previous embodiment. The first layer 110 is provided with first and second material portions 111 and 112, and the temperature measurement layer 130 is provided with a thermocouple portion 131 having first and second contacts 131a and 131b, so as to measure a temperature difference in a surface direction.

However, the second layer 120 of this embodiment is further provided with a fifth material portion 225. The fifth material portion 225 functions to differently form heat transfer quantities Qc and Qd passing through the first material portion 111 and the second material portion 112. Specifically, the fifth material portion 225 may be formed to overlap at least part of the first and second material portions 111 and 112 in a thickness direction. At this time, the fifth material portion 225 may be made of a single material so as to be located on a part of the first and second material portions 111 and 112.

At this time, the temperature measurement layer 130 may include a convection sensing thermocouple portion 235 provided with a third contact 235c disposed between the first material portion 111 and the fifth material portion 225, and a fourth contact 235d disposed between the second material portion 112 and the fifth material portion 225. The convection sensing thermocouple portion 235 may be formed in the same shape as the thermocouple portion 131. The convection sensing thermocouple portion 235, separate from the thermocouple portion 131, may have both end portions connected to a controller so as to transfer a separate electromotive force signal to the controller.

As illustrated in FIG. 5, the fifth material portion 225 of the same material may be provided above the third and fourth contacts 235c and 235d, so that a temperature difference T3–T4 detected by the convection sensing thermocouple portion 235 of this embodiment can be the same value as a temperature difference Ts3–Ts4 generated on an upper surface of the fifth material portion 225. When a fluid flow (an air flow due to a convective heat transfer, for example) is formed on the fifth material portion 225 in a state where each of the temperature differences is generated by a predetermined value due to the heat transfer rate of the object 10, the temperature difference Ts3–Ts4 generated on the upper surface of the fifth material portion 225 may change. The temperature difference Ts3–Ts4 may affect the temperature difference T3–T4 of the convection sensing thermocouple portion 235 because each temperature is changed due to the same temperature gradient formed along the thickness direction of the fifth material portion 225. Therefore, the convection sensing thermocouple portion 235 may detect a degree and duration of a change in a spatial temperature distribution due to an affection of external air.

The heat transfer rate measurement device 200 according to this embodiment which is provided with the convection sensing thermocouple portion 235 can be sensitive to changes in the external air convection flow and thus detect an affection of the external air. Thus, the affection of the external air can be continuously monitored during the measurement of the heat transfer rate. That is, additional information related to an external environment can be obtained, and reflected for the calculation of the heat transfer rate. Specifically, this may result in calculating a sensible temperature which is generated due to the external air flow on the surface of the object 10.

Particularly, in order to sensitively reflect the temperature change of the upper surface of the fifth material portion 225 at the convection sensing thermocouple portion 235, the fifth material portion 225 may be made of a material having relatively high thermal conductivity, for example, a metallic material. At this time, for an electric insulation from the convection sensing thermocouple portion 235, the temperature measurement layer 130 may be provided with an insulating layer 134 located between the convection sensing thermocouple portion 235 and the fifth material portion 225.

Figure 6:
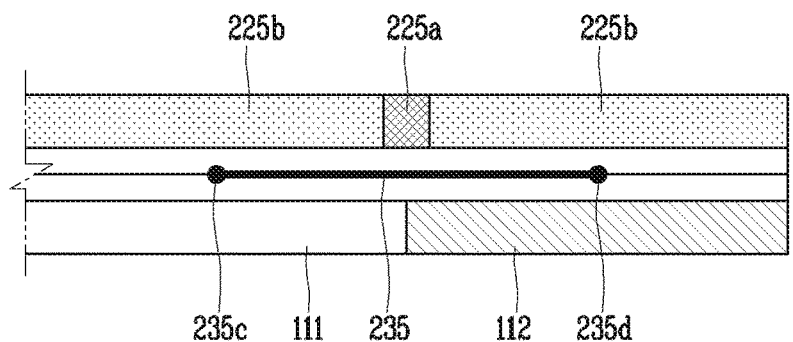
FIG. 6 is a sectional view illustrating another example of a fifth material portion illustrated in the embodiment of FIG. 5.

In addition, FIG. 6 is a sectional view illustrating another example of the fifth material portion 225 illustrated in the embodiment of FIG. 5. The another example of FIG. 6 illustrates a case where the temperature difference T3–T4 between the third contact 235c and the fourth contact 235d can reflect more accurately the temperature difference Ts3–Ts4 on the upper surface of the fifth material portion 225.

Referring to FIG. 6, the fifth material portion 225 may include thermal conduction promoting portions 225a and a thermal conduction slowing portion 225b. The thermal conduction promoting portions 225a may be spaced apart from each other to overlap the third contact 235c and the fourth contact 235d, respectively, and may be made of a material having higher thermal conductivity than the thermal conduction slowing portion 225b.

The thermal conduction slowing portion 225b may be disposed between the thermal conduction promoting portions 225a. In particular, the thermal conduction slowing portion 225b may be located in parallel with a contacted point between the first material portion 111 and the second material portion 112 in the thickness direction. The thermal conduction slowing portion 225b may be made of a material having relatively lower thermal conductivity than the thermal conduction promoting portions 225a.

The thermal conduction slowing portion 225b may restrict an occurrence of thermal conduction in the surface direction between the two thermal conduction promoting portions 225a. This may result in restricting a reduction of the temperature differences T3–T4 and Ts3–Ts4 in the surface direction, and measuring the affection of the external air convection more sensitively.

Figure 7:
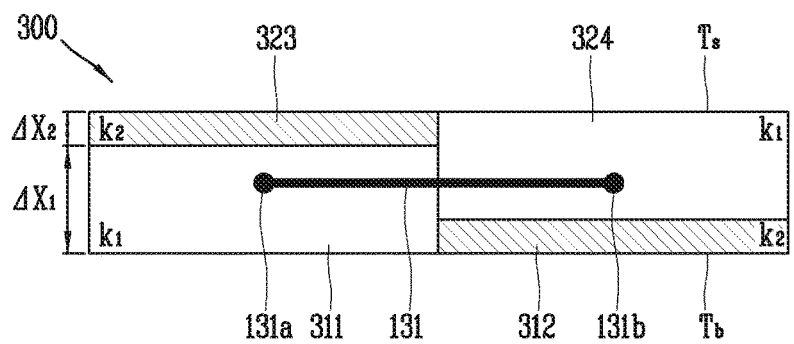
FIG. 7 is a sectional view illustrating a heat transfer rate measurement device in accordance with another embodiment of the present invention.

On the other hand, FIG. 7 is a sectional view illustrating a heat transfer rate measurement device 300 according to another embodiment of the present invention. With reference to this embodiment, description will be given of a configuration for accurately measuring a heat transfer rate according to the aforementioned principle even when first to fourth material portions 311, 312, 323, and 324 have different thicknesses.

The heat transfer rate measurement device 300 according to this embodiment includes first to fourth material portions 311, 312, 323, and 324. The first material portion 311 is disposed such that a lower surface thereof faces the surface of the object 10, and the second material portion 312 is disposed adjacent to the first material portion 311 so that a lower surface thereof faces the surface of the object 10. The first material portion 311 and the second material portion 312 are made of materials having different thermal conductivities.

The third material portion 323 which is made of a material having the same thermal conductivity as the second material portion 312 is coupled to an upper surface of the first material portion 311. At this time, the second and third material portions 312 and 323 have the same thickness, that is, the same height in a vertical direction.

The fourth material portion 324 which is made of a material having the same thermal conductivity as the first material portion 311 is coupled to an upper surface of the second material portion 312. The fourth material portion 324 has the same thickness as the first material portion 311. As a result, as illustrated in FIG. 7, the first to fourth material portions 311, 312, 323, and 324 may be formed to have predetermined thicknesses.

Meanwhile, the heat transfer rate measurement device 300 according to this embodiment further includes a thermocouple portion 131. The thermocouple portion 131 forms a first contact 131a and a second contact 131b to measure a temperature difference between the two points. The first contact 131a is located within the first material portion 311 or the third material portion 323, and the second contact 131b is spaced apart from the first contact 131a in the surface direction of the object 10 so as to be located within the fourth material portion 324 or the second material portion 312.

Furthermore, the heat transfer rate measurement device 300 of this embodiment may further include a controller (not illustrated) for calculating a heat transfer rate as follows.

Similar to the previous one embodiment, it is assumed that an entire cross-sectional area where a heat transfer occurs is A, thermal conductivity of the first and fourth material portions 311 and 324 is k1, thermal conductivity of the second and third material portions 312 and 323 is k2, and k1>k2. A temperature of each point is as illustrated in FIG. 7.

And, when it is assumed that a thickness of the first and fourth material portions 311 and 324 is $\Delta x1$ and a thickness of the second and third material portions 312 and 323 is $\Delta x2$, $\Delta x1 > \Delta x2$ is established as illustrated in FIG. 7. If a ratio between them is $C(=\Delta x1/\Delta x2)$, a conductive heat transfer equation may be calculated as follows.

$$Q_t = \frac{1}{R_t}(T_b - T_s)$$

$$\frac{1}{R_t} = \frac{A}{\Delta x_2}\left(\frac{k_1 k_2}{k_1 + C k_2}\right)$$

In addition, similar to the previous one embodiment, a ratio between a temperature difference Tb−Ts in the thickness direction of the heat transfer rate measurement device 300 and a temperature difference T1−T2 between the first and second contacts 131a and 131b may be calculated as follows.

$$T_b - T_s = \left(\frac{k_1 + Ck_2}{k_1 - k_2}\right)(T_1 - T_2)$$

Accordingly, the total heat transfer rate is summarized as follows with respect to the temperature difference T1−T2 between the first and second contacts 131a and 131b.

$$Q_t = \frac{A}{\Delta x_2}\left(\frac{k_1 k_2}{k_1 - k_2}\right)(T_1 - T_2)$$

On the other hand, unlike the above case, when Δx1<Δx2 is satisfied and the ratio of them is C(=Δx2/Δx1), the total heat transfer rate may be calculated as follows.

$$Q_t = \frac{A}{\Delta x_1}\left(\frac{k_1 k_2}{k_1 - k_2}\right)(T_1 - T_2)$$

The heat transfer rate measurement device 300 according to the another embodiment of the present invention has an advantage in that the thickness of each material portion does not necessarily have to be uniformly manufactured. That is, upon satisfying only a condition that the first material portion 311 and the fourth material portion 324 have the same thickness and the second material portion 312 and the third material portion 323 have the same thickness, the heat transfer rate of the object 10 can be accurately measured by the temperature difference in the surface direction.

Also, in this embodiment, material portions of the same material which are arranged in an alternating manner maybe designed to be in contact with each other.

Accordingly, when only one of the first material portion 311 and the second material portion 312 is made of an electrically insulating material, the insulating portion 133 for electrically insulating the thermocouple portion 131 may be possibly omitted.

Therefore, according to this embodiment, the restrictions on the shape and material of the heat transfer rate measurement device 300 can be alleviated, and convenience in fabrication can be improved.

The foregoing description is merely illustrative for the embodiments to implement the heat transfer rate measurement device according to the present invention, and thus the present invention is not limited to the foregoing embodiments. It will be understood by those ski 1 led in the art that various changes in form and details may be made therein without departing from the spirit and scope of the invention as defined by the appended claims.

INDUSTRIAL APPLICABILITY

The present invention can be used to measure a heat transfer rate or heat insulation performance of an object in a wide range of industrial field as well as researches related to the heat transfer.

The invention claimed is:

1. A device for measuring a heat transfer rate, the device comprising:
   a first layer provided with a first material portion and a second material portion disposed in parallel in a surface direction of an object and having different thermal conductivities;
   a second layer provided with a third material portion disposed in parallel with the first material portion in a thickness direction of the first layer and having the same thermal conductivity as the second material portion, and a fourth material portion disposed in parallel with the second material portion in the thickness direction and having the same thermal conductivity as the first material portion; and
   a temperature measurement layer interposed between the first layer and the second layer, and configured to measure a temperature difference in the surface direction to calculate a heat transfer rate of the object,
   wherein the temperature measurement layer comprises:
   a thermocouple portion provided with a first contact located between the first material portion and the third material portion, and a second contact located between the second material portion and the fourth material portion; and
   a noise detector made of an electrically conductive material, having a shape corresponding to the thermocouple portion, and disposed in parallel with the thermocouple portion, and
   wherein the thermocouple portion and the noise detector are arranged in parallel with each other in the thickness direction, such that the electric noise is removed to enhance the heat transfer rate measurement efficiency.

2. The device of claim 1,
   wherein the temperature measurement layer further includes an insulating portion inserted between the thermocouple portion and the noise detector.

3. The device of claim 1, further comprising a controller electrically connected to the thermocouple portion and the noise detector, respectively, and configured to calculate the heat transfer rate of the object based on a value obtained by subtracting an electromotive force sensed by the noise detector from an electromotive force sensed by the thermocouple portion.

4. A device for measuring a heat transfer rate, the device comprising:
   a first layer provided with a first material portion and a second material portion disposed in parallel in a surface direction of an object and having different thermal conductivities;
   a second layer provided with a third material portion disposed in parallel with the first material portion in a thickness direction of the first layer and having the same thermal conductivity as the second material portion, a fourth material portion disposed in parallel with the second material portion in the thickness direction and having the same thermal conductivity as the first material portion, and a fifth material portion formed to overlap at least part of the first and second material portions in the thickness direction; and
   a temperature measurement layer interposed between the first layer and the second layer, and configured to measure a temperature difference in the surface direction to calculate a heat transfer rate of the object,
   wherein the temperature measurement layer comprises:
   a thermocouple portion provided with a first contact located between the first material portion and the third material portion, and a second contact located between the second material portion and the fourth material portion; and a convection sensing thermocouple portion provided with a third contact located between the first material portion and the fifth material portion, and a fourth contact disposed between the second material portion and the fifth material portion.

5. The device of claim 4, wherein the temperature measurement layer is provided with an insulating layer interposed between the convection sensing thermocouple portion and the fifth material portion, and wherein the fifth material portion is made of a metallic material.

6. The device of claim 4, wherein the fifth material portion comprises:

thermal conduction promoting portions located to overlap the third contact and the fourth contact, respectively; and a thermal conduction slowing portion located between the thermal conduction promoting portions and made of a material having lower thermal conductivity than that of the thermal conduction promoting portions.

7. A device for measuring a heat transfer rate, the device comprising:

a first material portion located in a manner that one surface thereof faces a surface of an object;

a second material portion located adjacent to the first material portion in a manner that one surface thereof faces the surface of the object, the second material portion being made of a material having thermal conductivity different from that of the first material portion;

a third material portion coupled to another surface of the first material portion and having the same thermal conductivity and thickness as those of the second material portion;

a fourth material portion coupled to another surface of the second material portion to be adjacent to the third material portion and having the same thermal conductivity and thickness as those of the first material portion; and a thermocouple portion provided with a first contact located within the first or third material portion, and a second contact located inside the fourth or second material portion to be spaced apart from the first contact in a surface direction of the object, wherein the first to the fourth material portions form a first and second layer having different heights, respectively.

8. The device of claim 7, further comprising a controller configured to calculate a heat transfer rate Qt of the object by the following equation, $$Q_t = \frac{A}{\Delta x}\left(\frac{k_1 k_2}{k_1 - k_2}\right)(T_1 - T_2)$$

[where T1 and T2 denote temperatures of the first contact and the second contact, k1 and k2 denote thermal conductivities of the first and second material portions (k1>k2), and $\Delta$x denotes a smaller value of a thickness of the first material portion and a thickness of the second material portion].

* * * * *